United States Patent [19]

Spring

[11] 4,380,992
[45] Apr. 26, 1983

[54] BURNER, ESPECIALLY FOR A FLAMBÉ PORTABLE STOVE OR THE LIKE

[75] Inventor: Markus Spring, Sirnach, Switzerland

[73] Assignee: Spring AG, Metallwarenfabrik, Eschlikon, Switzerland

[21] Appl. No.: 182,973

[22] Filed: Sep. 2, 1980

[30] Foreign Application Priority Data

Sep. 11, 1979 [DE] Fed. Rep. of Germany ....... 2936595

[51] Int. Cl.³ ............................................... F24C 5/00
[52] U.S. Cl. .................................................... 126/43
[58] Field of Search .................. 126/15 R, 39 E, 39 J, 126/39 K, 43, 39 L, 44, 45, 15 A; 431/310–314, 431/144, 146

[56] References Cited

U.S. PATENT DOCUMENTS

| | | | |
|---|---|---|---|
| 1,983,372 | 12/1934 | Horsley | 431/310 |
| 1,991,135 | 2/1935 | Brown | 126/39 K |
| 2,022,897 | 12/1935 | Neumeister | 431/310 |
| 2,290,826 | 7/1942 | Scheu et al. | 126/15 R |
| 2,568,192 | 9/1951 | Histed | 126/15 R |
| 2,780,216 | 2/1957 | Beaudoin | 126/15 R |
| 2,842,076 | 7/1958 | Martin | 126/15 R |
| 3,606,609 | 9/1971 | Lipper et al. | 126/43 X |
| 4,188,938 | 2/1980 | Hasenfratz | 126/43 |

FOREIGN PATENT DOCUMENTS 580829  4/1924  France ................................ 126/43

*Primary Examiner*—Larry Jones
*Attorney, Agent, or Firm*—Diller, Ramik & Wight

[57] ABSTRACT

A burner for a small portable stove, especially for a flambé or flaming stove, comprises a burner lower portion equipped with a fuel container, a burner upper portion having a central flame opening and an extinguishing cover for the flame opening. The burner upper portion which is constructed as a cover can be controllably raised with respect to the burner lower portion in order to form an air inlet gap which extends completely about the burner. Between the burner lower portion and the burner upper portion there are provided at least three run-on inclined elements or ramps, so that by movement, such as displacement or rotation of the upper portion with respect to the lower portion, it is possible to alter the height of the air inlet gap.

2 Claims, 4 Drawing Figures

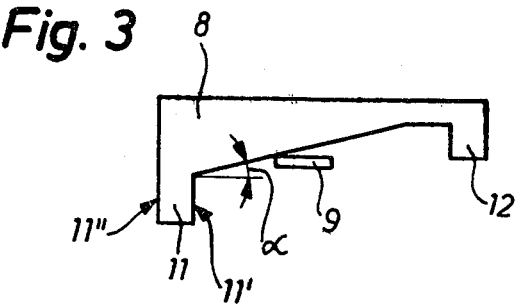
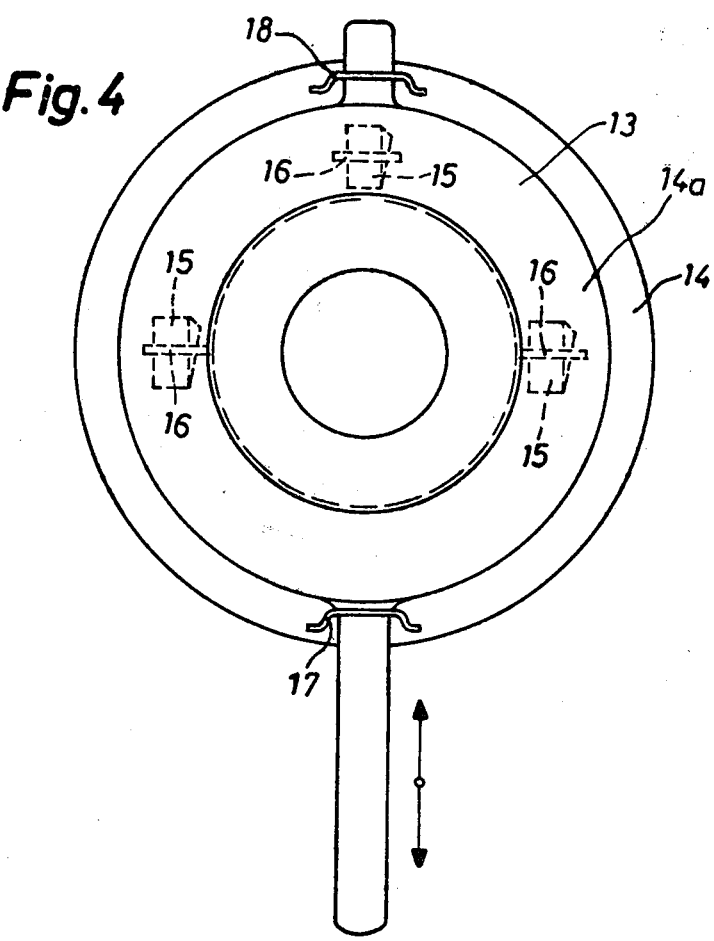

BURNER, ESPECIALLY FOR A FLAMBE PORTABLE STOVE OR THE LIKE

BACKGROUND OF THE INVENTION

The present invention relates to a new and improved construction of a burner for a small portable stove, especially for a flaming or flambé stove, which is of the type comprising a burner lower portion containing a fuel container, a burner upper portion having a central flame opening and an extinguishing cover for the flame opening.

Burner arrangements of this type are known to the art. The burner lower portion itself or a suitable insert container houses the fuel. To operate the burner it is necessary to infeed air or oxygen to the fuel, so that the actual combustion process can proceed. Normally for this purpose the burner upper portion is provided with a number of openings or ports, which can be extensively closed or opened by means of a regulating or control element, in order to be able to regulate the flame.

However, the use of even a relatively large number of air infeed holes or openings does not allow for any really infinite setting or adjustment of the flames, as such would be desirable for certain purposes.

SUMMARY OF THE INVENTION

Therefore, with the foregoing in mind it is a primary object of the present invention to provide a new and improved construction of a burner arrangement of the character mentioned which is not associated with the aforementioned drawbacks and limitations of the prior art proposals.

Another and more specific object of the present invention aims at eliminating the aforementioned drawbacks and devising a burner by means of which it is possible to infinitely control or regulate an air infeed gap, and thus, to provide an extensively optimum combustion of the fuel, especially when using pasty fuels.

Another and more specific object of the present invention aims at providing a new and improved construction of a burner, especially for a flambé portable stove, which is relatively simple in construction and design, economical to manufacture, extremely reliable in operation, easy to use, and provides for a wide range of setting of the size of the air infeed opening for feeding air to the fuel undergoing combustion.

Now in order to implement these and still further objects of the invention, which will become more readily apparent as the description proceeds, the present invention contemplates a burner of the previously mentioned character which, according to the invention, contemplates controllably or regulatably raising the burner upper portion with respect to the burner lower portion for the purpose of forming an air infeed or inlet gap which extends about the burner. Between the burner lower portion and the burner upper portion there are provided at least three run-on inclined elements or ramps, so that due to appropriate movement, such as displacement or rotation of the burner upper portion with respect to the burner lower portion, it is possible to alter the height of the air inlet gap.

In this connection it is immaterial whether the run-on inclined elements are arranged at the burner upper portion or the burner lower portion. With a burner design wherein the burner upper portion is rotatable it is advantageous to provide the run-on inclined elements or ramps or the like at the burner upper portion and to provide the inclined portions or surfaces of the ramps at the same time with end stops for both extreme positions.

According to a further embodiment of the burner using a linearly displaceable burner upper portion the inclined surfaces of the ramps or the like can be mounted at the upper surface or side of the burner lower portion.

With both embodiments it is of course possible to provide means in order to be able to positively guide the burner upper portion, in each operating position thereof, at the burner lower portion.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 illustrates in schematic perspective view a run-on inclined element or ramp, defining a camming or inclined surface, used with the burner of the invention; and FIG. 4 illustrates in top plan view a variant embodiment of the burner according to the invention, wherein the burner upper portion can be linearly shifted or displaced in order to adjust the air infeed gap.

DETAILED DESCRIPTION OF THE PREFERRED EMBODIMENTS

Figure 1:
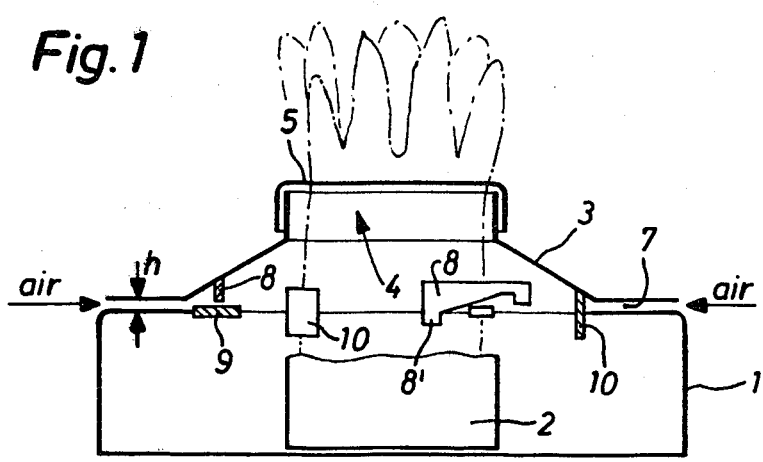
FIG. 1 is a cross-sectional view, purely in schematic showing, of a burner or burner arrangement according to the invention.

Describing now the drawings, in FIG. 1 there will be particularly apparent the principle construction of a burner or burner arrangement according to the invention. It will be seen to comprise a burner lower portion 1 containing a fuel container insert 2, a burner upper portion 3 rotatably arranged upon the burner lower portion 1, this burner upper portion 3 having a central flame opening 4, and a flame extinguishing cover member 5.

The air needed for the combustion process is infed by an infeed air gap 7 extending about the burner. This air gap 7 has a height $h$ which can be randomly and infinitely adjusted between null and a predetermined maximum value.

On the one hand, this can be realized by means of so-called run-on inclined elements or ramps 8 or equivalent structure mounted at the burner upper portion 3 and, on the other hand, tongue members or tabs 9 or the like which are mounted at the burner lower portion 1 and coact with the ramps 8. By turning the burner upper portion 3, which is centered by means of guide elements 10 at the burner lower portion 1, it is possible to randomly adjust the air gap $h$.

The centering of the burner upper portion 3, instead of using the additional guide elements 10, also could be accomplished by providing an appropriate prolongation or extension of the nose or protuberance 8' of the run-on inclined elements or ramps 8.

In this way it is possible to obtain with the most simple means, in relation to heretofore known burners, an appreciably better efficiency and to realize throughout every possible range a controlled, regulatable combustion of the fuel.

Figure 2:
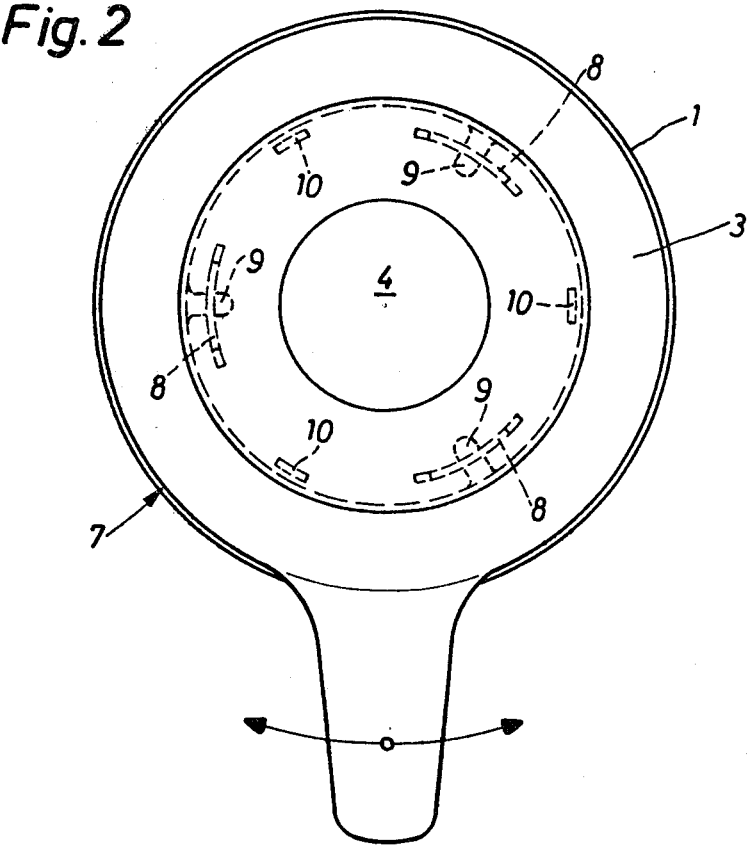
FIG. 2 is a top plan view of the burner shown in FIG. 1.

FIG. 2 illustrates the burner shown in FIG. 1 in the top plan view.

FIG. 3 shows in markedly enlarged view one of the run-on inclined elements 8 which is particularly important for the invention, and which coacts with a related tongue member 9 or the like. The run-on inclined elements or ramps 8 are provided with stop elements 11 and 12 in order to limit the adjustment movement of the burner and to fix two end positions. The length of the adjustment path is of course freely selectable as is also, for instance, the angle of attack α of the inclined element or ramp 8. This angle α can be selected such that the frictional contact between the parts 8 and 9 is sufficient to retain the selected adjusted position.

Also in this case it would be possible to omit the stop or impact element 12. In order to nonetheless obtain a limited adjustment movement, there could be mounted at the burner lower portion 1 additional tongue members 9 against which could bear the stop element 11 by means of its second stop edge 11". When using such additional tongues or equivalent structure the stop element 11, in the raised position of the burner upper portion 3, contacts by means of its edge 11" against the tongue 9, but however, in the lowered position the edge 11" contacts against a not particularly illustrated additional tongue member 9.

FIG. 4 of the drawing shows a variant construction of the burner which essentially is designed similar to the construction disclosed above in conjunction with FIG. 1, but wherein however here the burner upper portion 13 is linearly displaceable in relation to the burner lower portion 14 instead of being rotatable.

As far as the principle of controlling the air gap 7 nothing is changed. With the illustrated embodiment there are provided run-on inclined elements or ramps 15 at the upper edge or top surface 14a of the burner lower portion 14, whereas appropriate slide elements 16 are arranged at a not particularly referenced lower surface or face of the burner upper portion 13. The burner upper portion 13 is guided within two guide elements or guides 17 and 18, for instance U-shaped clips or brackets.

In contrast to the solution using a rotatable regulation of the air infeed slot or opening 7, as explained above with respect to the embodiment of FIG. 1, the variant embodiment of FIG. 4, working with linear displacement of for instance the burner upper portion 13 relative to the burner lower portion 14 has the drawback of somewhat less optimum adjustment possibility, since the air inlet gap does not have exactly the same geometry in all positions by virtue of such displacement.

While there are shown and described present preferred embodiments of the invention, it is to be distinctly understood that the invention is not limited thereto, but may be otherwise variously embodied and practiced within the scope of the following claims. Accordingly,

What is claimed is:

1. A burner for a small portable stove, especially for a flambe stove, comprising:
   a burner lower portion equipped with a fuel container for a fuel which is to be combusted;
   a burner upper portion having a flame opening and cooperating with said burner lower portion;
   means for regulatably lifting said burner upper portion with respect to said burner lower portion for forming an air inlet gap extending at least partially about said burner;
   said means for regulatably lifting said burner upper portion comprising at least three run-on inclined elements between the burner upper portion and said burner lower portion, so that by moving the burner upper portion in relation to the burner lower portion it is possible to alter the height of said air inlet gap;
   said run-on inclined elements are provided at an underside of said burner upper portion; and said lifting means further including means coacting with said run-on inclined elements provided at the burner lower portion;
   said coacting means at said burner lower portion comprising fixed tongues; and
   said burner upper portion being rotatable relative to said burner lower portion for adjusting the air inlet gap.

2. A burner for a small portable stove, especially for a flambe stove, comprising:
   a burner lower portion equipped with a fuel container for a fuel which is to be combusted;
   a burner upper portion having a flame opening and cooperating with said burner lower portion;
   means for regulatably lifting said burner upper portion with respect to said burner lower portion for forming an air inlet gap extending at least partially about said burner;
   said means for regulatably lifting said burner upper portion comprising at least three run-on inclined elements between the burner upper portion and said burner lower portion, so that by moving the burner upper portion in relation to the burner lower portion it is possible to alter the height of said air inlet gap;
   said run-on inclined elements are provided at an underside of said burner upper portion; and said lifting means further including means coacting with said run-on inclined elements provided at the burner lower portion;
   said coacting means at said burner lower portion comprising fixed tongues; and
   said burner upper portion being lengthwise displaceable with respect to the burner lower portion for adjusting the air inlet gap.

* * * * *